(12) United States Patent
Jain et al.

(10) Patent No.: US 9,684,702 B2
(45) Date of Patent: Jun. 20, 2017

(54) DATABASE REDISTRIBUTION UTILIZING VIRTUAL PARTITIONS

(75) Inventors: Saurabh Jain, New Delhi (IN); Neeraj S. Sharma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 622 days.

(21) Appl. No.: 12/961,544

(22) Filed: Dec. 7, 2010

(65) Prior Publication Data

US 2012/0143823 A1 Jun. 7, 2012

(51) Int. Cl.
*G06F 17/00* (2006.01)
*G06F 17/30* (2006.01)

(52) U.S. Cl.
CPC .. *G06F 17/30584* (2013.01); *G06F 17/30312* (2013.01)

(58) Field of Classification Search
CPC .................................... G06F 17/30575
USPC ....................................... 707/640
See application file for complete search history.

(56) References Cited

U.S. PATENT DOCUMENTS

| | | | |
|---|---|---|---|
| 4,853,843 A * | 8/1989 | Ecklund | 364/200 |
| 6,292,795 B1 | 9/2001 | Peters et al. | |
| 6,330,653 B1 * | 12/2001 | Murray et al. | 711/173 |
| 6,397,308 B1 | 5/2002 | Ofek et al. | |
| 6,574,705 B1 * | 6/2003 | Peloquin et al. | 711/114 |
| 6,745,207 B2 * | 6/2004 | Reuter et al. | 707/200 |
| 2007/0271211 A1 * | 11/2007 | Butcher et al. | 707/1 |
| 2010/0235606 A1 * | 9/2010 | Oreland et al. | 711/173 |
| 2011/0108784 A1 | 5/2011 | Bogh-Sorensen | |
| 2011/0208748 A1 | 8/2011 | Chaudhuri et al. | |
| 2011/0208784 A1 * | 8/2011 | Butcher et al. | 707/803 |

FOREIGN PATENT DOCUMENTS

| | | |
|---|---|---|
| CN | 01128827 A | 2/2008 |
| EP | 2317450 A1 | 5/2011 |
| JP | 2001142752 A | 5/2001 |
| JP | 2005196602 A | 7/2005 |
| JP | 2005056077 A | 4/2010 |
| JP | 2010079624 A | 4/2010 |
| JP | 2004178253 A | 11/2011 |

OTHER PUBLICATIONS

Poniatowski M., "Backup of Virtual Partitions", HP-UX 11i Systems Administration Handbook and Toolkit, 2003.*

* cited by examiner

*Primary Examiner* — Mariela Reyes
*Assistant Examiner* — Dawaune Conyers
(74) *Attorney, Agent, or Firm* — Brian F. Russell; William Stock

(57) ABSTRACT

In some embodiments, a partitioned database is stored in a plurality of logical or physical partitions on at least a logical or physical first data storage node, and a subset of a first partition among the plurality of logical partitions is configured as a virtual partition. An input indicating an allocation of a second physical data storage node to store the partitioned database is received. A second partition is configured on the second data storage node. In response to the input, the partitioned database is redistributed over the first and second data storage nodes by moving data within the virtual partition on the first partition to the second partition.

12 Claims, 10 Drawing Sheets

*Figure 4*

| LP0 | LP1 | LP2 | LP3 | LP4 | LP5 | LP6 | LP7 |
|---|---|---|---|---|---|---|---|
| B0 | B1 | B2 | B3 | B4 | B5 | B6 | B7 |
| B8 (VP8) | B9 (VP9) | B10 (VP10) | B11 (VP11) | B12 (VP12) | B13 (VP13) | B14 (VP14) | B15 (VP15) |

400

350

| Node No. 502 | Hostname 504 | Logical Port No. 506 | VP 508 |
|---|---|---|---|
| ... | ... | ... | ... |

*Figure 5*

| Hash Value 602 | Virtual Partition No. 604 | Logical Partition No. 606 |
|---|---|---|
| ... | ... | ... |

*Figure 6*

DATABASE REDISTRIBUTION UTILIZING VIRTUAL PARTITIONS

BACKGROUND OF THE INVENTION

1. Technical Field

The present invention relates in general to data processing, and in particular, to redistribution of a partitioned database.

2. Description of the Related Art

In computing environments in which a large volume of data is stored, the data are commonly managed by a relational database management system (RDBMS), which can be utilized to instantiate one or more databases for storing, accessing and manipulating the data. Each databases includes one or more table spaces, which in turn store table data in accordance with the relational data model. As implied by tabular organization, the table data is logically arranged in rows and columns, with each table row having an associated row key.

To provide enhanced manageability, performance and/or availability, a relational database is commonly partitioned into multiple logical or physical partitions (hereinafter, simply referred to as a "partition" unless a more definite meaning is required), each having its own data, indexes, configuration files, and transaction logs. Table data of any given table can be located in one or more of the partitions, with the partition on which the table data resides typically being determined by a hash function. Because data is distributed across database partitions, the power of multiple processors, possibly on multiple computers, can be harnessed in tandem to store, retrieve, process and manage the data in the database.

Enterprises that manage large data volumes, such as online transaction processing (OLTP) systems, data warehousing enterprises, insurance and financial companies, etc., are frequently required to expand their data storage and processing capacities as the volume of stored data grows. For example, an enterprise may add one or more additional servers and their associated storage nodes to the existing information technology (IT) infrastructure of the enterprise in order to handle an increased volume of data while avoiding a degradation in query response times.

To make use of the additional servers, the RDBMS must redistribute and reorganize one or more database instances so that the database instance(s) reside not only on the storage nodes of the existing servers, but also on the storage nodes of the newly installed servers. A conventional process by which a RDBMS redistributes and reorganizes a database in accordance with the prior art is depicted in FIG. 1.

The conventional process of redistributing and reorganizing a database begins at block 100 and thereafter proceeds to block 102, which depicts the RDBMS making a backup of the entire database that is to be redistributed. Depending upon the size of the database, making a backup of the database can consume significant processing time (e.g., days or weeks). The process then enters an iterative loop including blocks 104-118 in which the database is redistributed row by row across the existing and new storage nodes. The redistribution begins at block 104, which depicts the RDBMS reading a key value of the next database row to be processed. The RDBMS then rehashes the key value of the database row to determine a target partition number on which the database row will reside following the redistribution (block 106). At block 110, the RDBMS determines whether the target partition number is the same as the existing partition number, meaning that the database row will not be moved. If the target partition number matches the existing partition number, the process passes to block 118, which is described below. If, however, the target partition number does not match the existing partition number, the process proceeds to blocks 112-116.

At blocks 112-116, the RDBMS reads the complete database row from the preexisting storage node, inserting the database row in a new partition on a newly added storage node, and then deleting the database row from the preexisting storage node. Thereafter, at block 118, the RDBMS determines whether or not all rows of the database have been processed. If not, the process returns to block 104, which has been described. If, however, RDBMS determines at block 118 that all rows of the database have been processed, the process proceeds to block 120.

As will be appreciated, the movement of selected database rows from the preexisting storage nodes to the newly installed storage nodes via the redistribution depicted at block 104-118 leaves the preexisting storage nodes sparsely populated and thus inefficiently utilized. Consequently, at block 120 the RDBMS reorganizes the database rows in the preexisting storage nodes to return the database to a compact storage organization. If the reorganization completes successfully, the RDBMS then makes a second backup of the entire database at block 122. In addition, as depicted at block 124, the RDBMS executes a utility to gather statistics regarding the database, to recharacterize the table spaces, indexes, and partitions, and to record these statistics in a catalog. Finally, at block 126, the RDBMS notifies any partition-aware applications (e.g., Microsoft® Internet Information Services (IIS)) of the reorganization of the database across the newly added storage nodes. Thereafter, the conventional process for redistributing and reorganizing the database ends at block 130.

FIGS. 2A-2C depict the redistribution and reorganization of a database over newly added data storage nodes in accordance with the prior art. In particular, FIG. 2A depicts a data storage system 200 including four database partitions 202a-202d that are populated with a database. Because the size of the database is nearing the capacity of the currently installed data storage nodes, a data warehousing enterprise may add one or more additional storage nodes to data storage system 200 in order to support additional database partitions.

In the example depicted in FIG. 2B, the data warehousing enterprise adds one or more additional storage nodes to data storage system 200 in order to support four additional database partitions 202e-202h. FIG. 2B further illustrates that, following the conventional row-by-row redistribution of the database depicted at blocks 104-118 of FIG. 1, the portion of the database moved to new database partitions 202e-202h is tightly compacted, but the portion of the database remaining on original database partitions 202a-202d is sparsely populated and therefore makes poor utilization of the storage capacity of data storage system 200. Accordingly, as discussed above with reference to block 120 of FIG. 1, the RDBMS must also reorganize the portion residing on database partitions 202a-202d to achieve the compact, well distributed database illustrated in FIG. 2C.

SUMMARY OF THE INVENTION

In some embodiments, a partitioned database is stored in a plurality of logical or physical partitions on at least a logical or physical first data storage node, and a subset of a first partition among the plurality of logical partitions is configured as a virtual partition. An input indicating an allocation of a second physical data storage node to store the partitioned database is received. A second partition is configured on the second data storage node. In response to the input, the partitioned database is redistributed over the first and second data storage nodes by moving data within the virtual partition on the first partition to the second partition.

BRIEF DESCRIPTION OF THE DRAWINGS

FIG. 4 shows an exemplary data storage node of the data processing enterprise of FIG. 3;

FIG. 5 illustrates an exemplary embodiment of a partition configuration data structure in accordance with one embodiment;

FIG. 6 depicts an exemplary embodiment of a partition map in accordance with one embodiment;

DETAILED DESCRIPTION OF ILLUSTRATIVE EMBODIMENT

Figure 3:
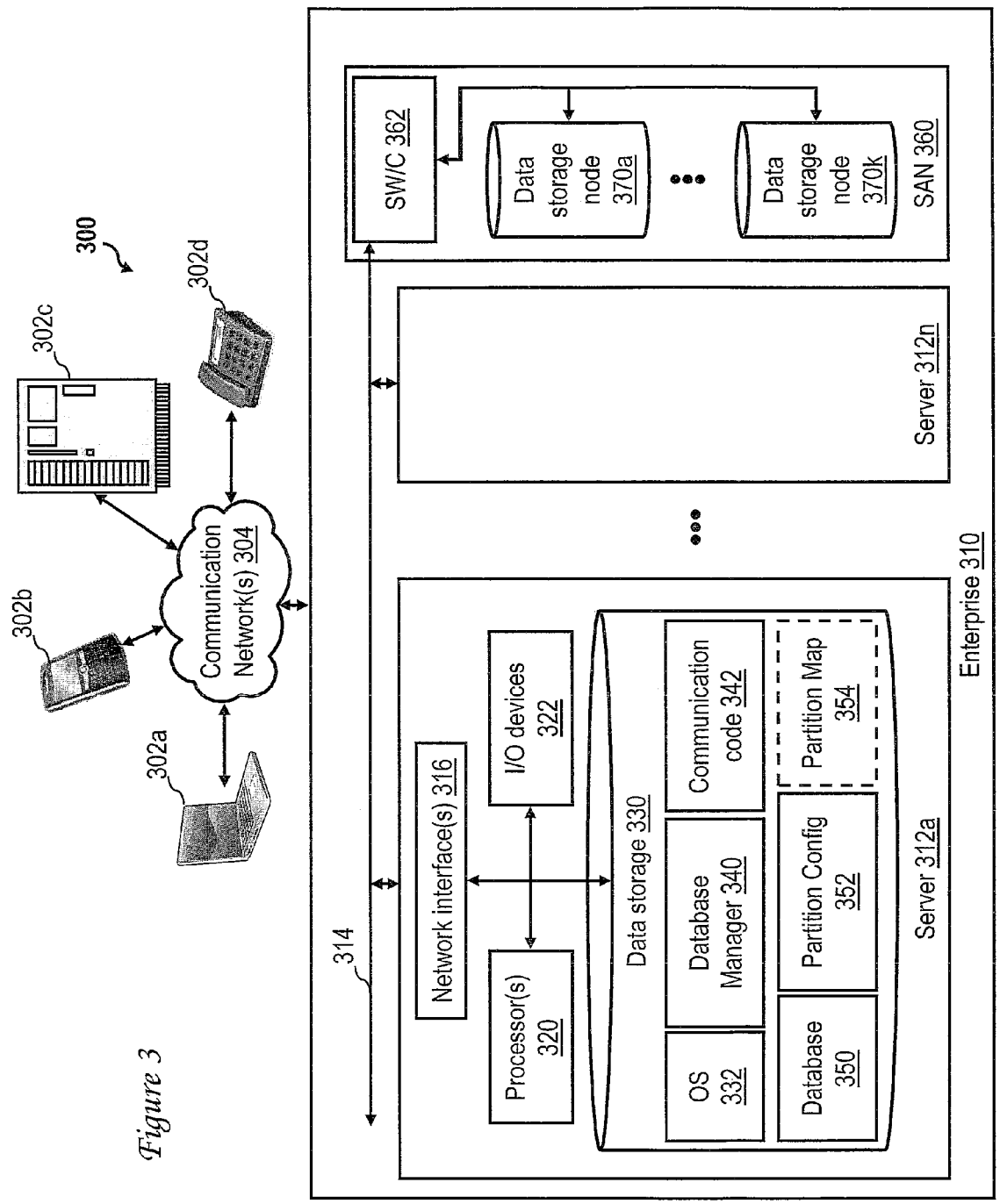
FIG. 3 illustrates an exemplary data processing environment in accordance with one embodiment.

With reference now to the figures and with particular reference to FIG. 3, there is illustrated a high level block diagram of an exemplary data processing environment 300 in accordance with one embodiment. As shown, exemplary data processing environment 300 includes an data processing enterprise 310, which can be operated or on behalf of an organization, such as a business, governmental agency, non-profit association, educational institution or the like, that manages a large volume of data. Data processing enterprise 310 is coupled for communication to one or more circuit-switched or packet-switched communication networks 304, such as wired or wireless local area or wide area network(s), cellular telephony network(s), and/or public switched telephone network(s) (PSTNs). Thus, data processing enterprise 310 may communicate with devices 302a-302d (e.g., server computer systems, personal computer systems, portable computer systems, mobile telephones, smart phones, landline telephones) via communication network(s) 304.

The communication between devices 302a-302d and data processing system 110 can include voice communication, for example, via a PSTN or voice over Internet Protocol (VoIP) connection, and/or data communication, for example, via instant messaging, Simple Mail Transport Protocol (SMTP) or Hypertext Transfer Protocol (HTTP). For example, the communication between data processing enterprise 310 and devices 302a-302d can include the transmission of data requests from devices 302a-302d to data processing enterprise 310 and the transmission of responsive data (e.g., formatted as program code, images, graphics, text, audio, video, and/or files containing such data) from data processing enterprise 310 to devices 302a-302d.

Still referring to FIG. 3, data processing enterprise 310 can include one or more physical computer systems, such as servers 312a-312n, which are coupled for communication by a communication fabric 314, which can include, for example, cabling and/or network connections, such as an intranet, virtual private network (VPN) or socket connection. In the illustrated exemplary embodiment, server 312a includes one or more network interfaces 316 that permit server 312a to communicate via communication networks 304 and communication fabric 314. Server 312a additionally includes one or more processors 320 that process data and program code, for example, to manages, access and manipulate data organized in one or more databases. Server 312a also includes input/output (I/O) devices 322, such as ports, displays, and attached devices, etc., which receive inputs and provide outputs of the processing performed by server 312a. Finally, server 312a includes data storage 330, which may include one or more volatile or non-volatile storage devices, including memories, solid state drives, optical or magnetic disk drives, tape drives, etc.

In the depicted embodiment, data storage 330 stores an operating system (OS) 332 that manages the hardware resources of server 312a and provides common services to other software executing on server 312a. For example, OS 332 may be implemented with one of the AIX®, Linux®, Android®, or Windows® operating systems. Data storage 330 also includes a database manager 122, such as the DB2® relational database management system (RDBMS) available from IBM Corporation of Armonk, N.Y., which manages, accesses and manipulates data within one or more databases, such as exemplary database 350. In some embodiments, database manager 340 may be integrated with OS 332 or another software program. In addition to database 350, database manager 340 maintains one or more partition configuration data structures 352 that define the various logical partitions of database 350 and map the partitions to the physical storage resources of data processing enterprise 310. Database manager 340 may optionally also maintain a partition map 354 that maps virtual partitions of database 350 to the logical partitions of database 350, as discussed further below.

In various embodiments, database manager 340 and/or OS 332 may include code to support communication of server 312a with other servers 312 and devices 302a-302d via communication fabric 314 and communication network (s) 304. Should appropriate communication capabilities not be integrated within OS 332 and/or database manager 340 in some embodiments, data storage 330 may additionally include communication code 342, such as a web server (e.g., Apache, IIS, etc.), Interactive Voice Response (IVR) and/or other program code, that enables server 312a to communicate with other servers 312 and devices 302a-302d via communication fabric 314 and communication network(s) 304. In particular, if implemented, communication code 342 supports the communication of database queries to database manager 340 and the communication of responsive data from database manager 340 to a requester.

It should be appreciated that the contents of data storage 330 can be localized on server 312a in some embodiments and will be distributed across the data storage 330 of multiple of servers 312a-312n in other embodiments. In addition, the contents depicted in data storage 330 of server 312a may optionally partially or fully reside on a storage area network (SAN) 360 of data processing enterprise 310. As shown, SAN 360 includes a switch/controller (SW/C) 362 that receives and services storage requests and multiple data storage nodes 370a-370k, each of which may comprise one or more physical non-volatile memory drives, hard disk drives, optical storage drives, tape drives, etc. In some embodiments, data storage nodes 370a-370k may be logical entities presenting virtualized abstractions of such physical storage resources.

It will be appreciated upon review of the foregoing description that the form in which data processing enterprise 312 is realized can vary between embodiments based upon one or more factors, for example, the type of organization, the size of database 350, the number of devices 302a-302d that can query database 350, etc. All such implementations, which may include, for example, one or more handheld, notebook, desktop, or server computer systems, are contemplated as embodiments of the inventions set forth in the appended claims.

FIG. 4 depicts a more detailed view of a data storage node 400 (e.g., a data storage node 370 of SAN 360 or a data storage node within data storage 330 of a server 312) within data processing enterprise 310 of FIG. 3. In the depicted example, data storage node 400 hosts eight logical or physical partitions, which are hereinafter assumed to be logical partitions numbered LP0-LP7, respectively. Logical partitions LP0-LP7 store a database 350, which includes sixteen data blocks numbered B0-B15, respectively. In a RDBMS, each of data blocks B0-B15 may correspond to one or more database rows having a common row key hash.

In accordance with the present disclosure, database manager 340 assigns a subset of data blocks B0-B15 to virtual partitions. For example, database manager 340 may assign each of data blocks B8-B15 to a respective one of eight virtual partitions numbered VP8-VP15. In various scenarios, each virtual partition can include one or more data blocks, which preferably all reside on a common logical partition. As discussed further below with reference to FIGS. 7-10, database manager 340 can efficiently redistribute database 350 by reference to the virtual partitions.

With reference now to FIG. 5, there is illustrated an exemplary embodiment of a partition configuration data structure 352 in accordance with one embodiment. In the depicted embodiment, partition configuration data structure 352, which may be implemented, for example, in one or more database configuration files, includes a plurality of configuration entries 500 defining a plurality of logical partitions of database 350 and mapping the logical partitions to the physical storage resources of data processing enterprise 310.

In an exemplary embodiment, each configuration entry 500 of partition configuration data structure 352 comprises a number of fields, including a node number field 502, a hostname field 504, a logical partition number field 506, and a virtual partition flag 508. Node number field 502 specifies an integer number uniquely identifying a partition of database 350. In contrast to conventional partitioned databases that restrict node numbers to logical partitions, node number field 502 preferably contains a unique node number for each logical and virtual partition of database 350. Hostname field 504 identifies the TCP/IP hostname (e.g., "ServerA") of the database partition identified in node number field 502. In addition, logical port field 506 specifies the logical port (e.g., logical partition) assigned to the database partition identified in node number field 502, and virtual partition flag 508 identifies whether or not the partition specified in node number field 502 is a virtual partition. It should be appreciated that configuration entries 500 may include one or more additional fields providing additional configuration information, such as a communication path to a logical partition and/or operating system-specific information.

Given the exemplary embodiment of partition configuration data structure 352 depicted in FIG. 5, the portion of partition configuration data structure 352 describing data storage node 400 of FIG. 4 can be given as shown in Table I below.

TABLE I

| Node No. | Hostname | Logical Port No. | VP |
|---|---|---|---|
| 0 | ServerA | 0 | — |
| 1 | ServerA | 1 | — |
| 2 | ServerA | 2 | — |
| 3 | ServerA | 3 | — |
| 4 | ServerA | 4 | — |
| 5 | ServerA | 5 | — |
| 6 | ServerA | 6 | — |
| 7 | ServerA | 7 | — |
| 8 | ServerA | 0 | V |
| 9 | ServerA | 1 | V |
| 10 | ServerA | 2 | V |
| 11 | ServerA | 3 | V |
| 12 | ServerA | 4 | V |
| 13 | ServerA | 5 | V |
| 14 | ServerA | 6 | V |
| 15 | ServerA | 7 | V |

With reference now to FIG. 6, there is illustrated an exemplary partition map 354 in accordance with one embodiment. In the depicted embodiment, database manager 340 implements partition map 354 as a lookup table including a plurality of rows 500, each of which includes a hash value field 502, a virtual partition number field 504, and a logical partition number field 506. Thus, each row 500 associates a respective hash value (e.g., derived via a hash function from a row key of a row of database 350) with a logical partition number, and if applicable, a virtual partition number. For example, assuming hash values ranging between 0 and 4095 and a data storage node 400 implementing eight logical partitions LP0-LP7 as shown in FIG. 4, partition map 354 can include 4096 rows 500 storing the values summarized in Table II below.

TABLE II

| Hash Value | Virtual Partition No. | Logical Partition No. |
|---|---|---|
| 0 | — | 0 |
| 1 | — | 1 |
| 2 | — | 2 |
| 3 | — | 3 |
| ... | ... | ... |
| 7 | — | 7 |
| 8 | 8 | 0 |
| 9 | 9 | 1 |
| 10 | 10 | 2 |
| ... | ... | ... |
| 15 | 15 | 7 |
| 16 | — | 0 |
| ... | ... | ... |
| 23 | — | 7 |
| 24 | 8 | 0 |
| ... | ... | ... |
| 31 | 15 | 7 |
| ... | ... | ... |
| 4095 | — | 7 |

Figure 7:
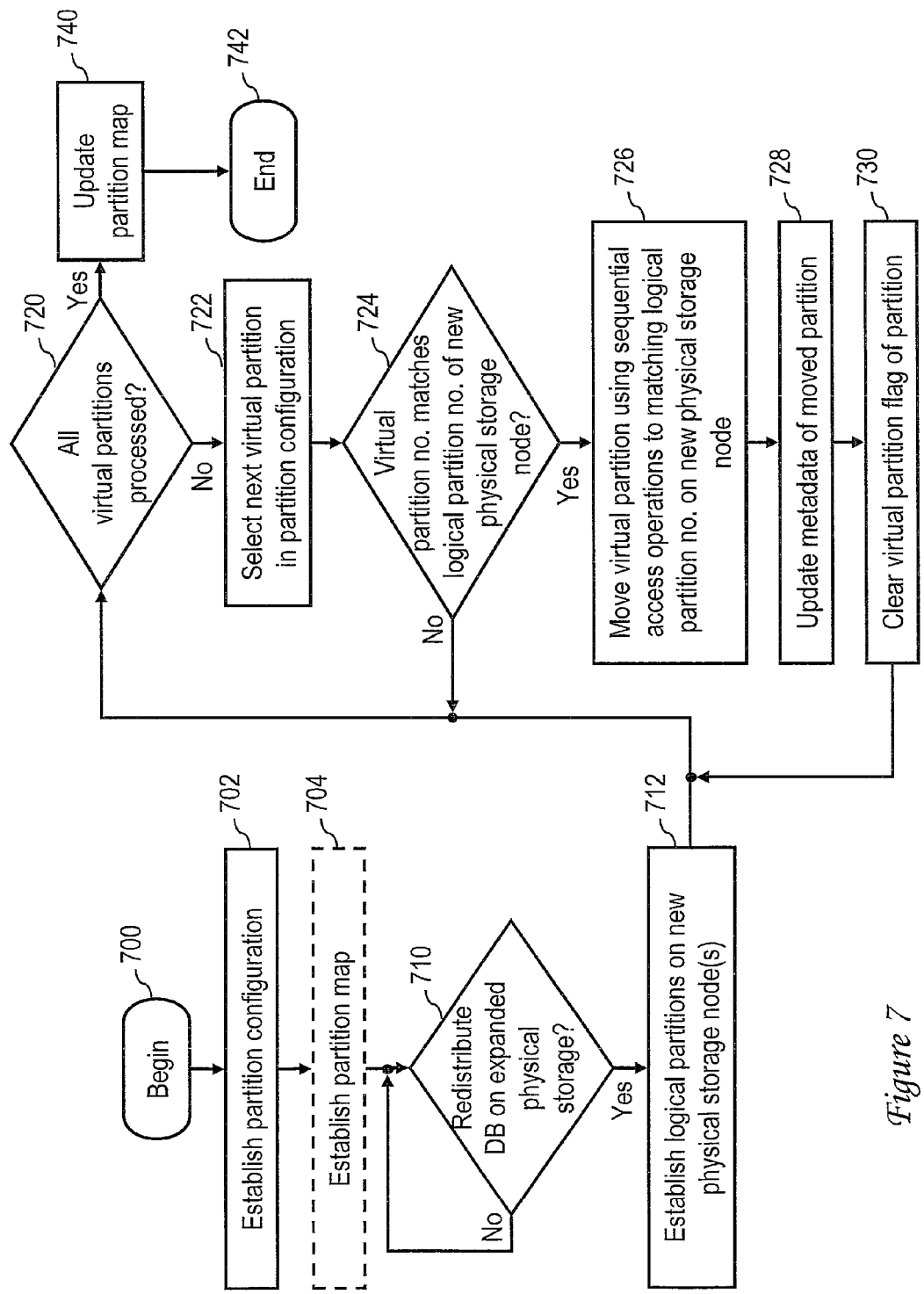
FIG. 7 is a high level logical flowchart of a first exemplary embodiment of a method of redistributing a database.

With reference now to FIG. 7, there is illustrated a high level logical flowchart of an exemplary method of redistributing a database in accordance with a first embodiment. The depicted method may be performed, for example, through the execution of database manager 340 by one or more processors 320 of a server 312. As with the other logical flowcharts presented herein, it should be understood that steps are depicted in a logical rather than strictly chronological order and that, in at least some embodiments, one or more steps may be performed contemporaneously or in a different order than illustrated.

The process depicted in FIG. 7 begins at block 700 and thereafter proceeds to block 702, which illustrates database manager 340 configuring a desired number of virtual partitions in database 350, for example, in response to an administrator input or automatically based upon predetermined defaults. In the exemplary partitioned database 350 described by Table I and depicted in FIG. 4, database manager 340 may enter the last eight entries 500 of partition configuration data structure 352 at block 702 in order to establish virtual partitions VP8-VP15 within logical partitions LP0-LP7, respectively. As noted above, the virtual partitions contain the data of database 350 that will be redistributed as the physical storage capacity allocated to store database 350 scales. With the number and location of virtual partitions configured, database manager 340 optionally establishes partition map 354 in order to quickly map between hash values (e.g., of row keys) of data and the logical and virtual partitions configured by partition configuration data structure 352 (block 704). Block 704 is optional in that database manager 340 could alternatively compute the logical and virtual partition associated with each hash value as needed.

The process proceeds from block 704 to block 710, which depicts database manager 340 determining whether or not an input has been received indicating that database 350 is to be redistributed over an expanded physical storage capacity. As will be appreciated, the expanded physical storage capacity available to store database 350 may become available through the addition of a server 312 to data processing enterprise 310, the addition of an additional data storage node 370 to SAN 360, and/or the reallocation of existing data storage node(s) of data processing enterprise 310 to store database 350. If database manager 340 does not detect an input indicating that database 350 is to be redistributed over an expanded physical storage capacity, the process remains at block 710. While the process remains at block 710, database manager 340 performs conventional database processing, including providing data responsive to structured query language (SQL) queries of database 350 and performing any requested management or configuration functions, etc., as is known in the art. In response to a determination by database manager 340 at block 710 that an input (e.g., a user command) has been received indicating that database 350 is to be redistributed over an expanded physical storage capacity, the process passes to block 712.

Block 712 depicts database manager 340 establishing logical partitions on the new physical storage node(s) allocated to store database 350. The process then enters a loop including blocks 720-730 in which virtual partitions are redistributed from the preexisting logical partitions to the new logical partitions established at block 712. Referring first to block 720, database manager 340 determines, for example, by reference to partition configuration data structure 352, whether or not all virtual partitions of database 350 have been processed. In response to database manager 350 determining at block 720 that all virtual partitions of database 350 have been processed, the process proceeds from block 720 to block 740, which is described below. If, however, database manager 350 determines at block 720 that not all virtual partitions of database 350 have been processed, database manager 350 selects a virtual partition for processing, for example, the next virtual partition listed in partition configuration data structure 352 (block 722).

At block 724, database manager 350 determines whether or not to move the virtual partition selected for processing, for example, by determining whether or not the virtual partition number matches a logical partition number assigned to one of the logical partitions established on the newly allocated storage node(s). In response to a determination not to move the currently selected virtual partition, the process returns to block 720, which has been described. If, however, database manager 350 determines at block 724 that the selected virtual partition is to be moved, the process passes to block 726. Block 726 depicts database manager 350 moving the data of the virtual partition using sequential access operations from the existing logical partition to the logical partition having a matching logical partition number. Database manager 350 then updates the metadata stored in association with the moved partition on the data storage node (block 728) and clears the virtual partition flag 508 of the associated configuration entry 500 in partition configuration data structure 352 (block 730). As a result, the moved partition is no longer a virtual partition and is converted into a data block of one of the logical partitions on the newly allocated data storage node. The process returns from block 730 to block 720, which depicts database manager 340 processing the next virtual partition, if any.

In response to database manager 340 determining at block 720 that all virtual partitions have been processed, database manager 340 updates partition map 354 to reflect the modified relationship between hash values and logical and virtual partition numbers (block 740). Following block 740, the process depicted in FIG. 7 ends at block 742.

Figure 8:
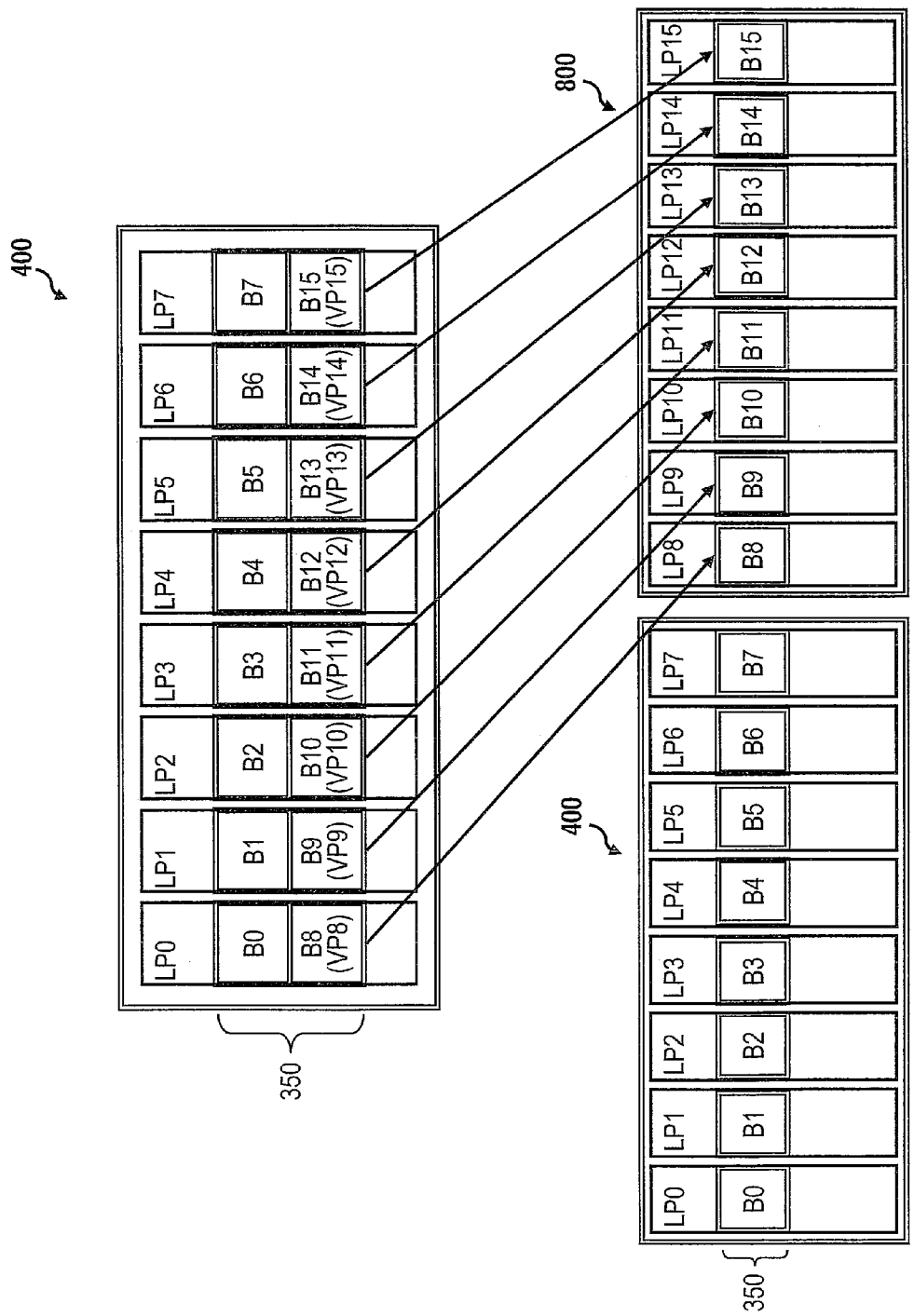
FIG. 8 illustrates an exemplary redistribution of a database in accordance with the first exemplary method depicted in FIG. 7.

FIG. 8 illustrates an exemplary redistribution of a database 350 from in accordance with the first exemplary method depicted in FIG. 7. In the example shown in FIG. 8, database 350 is originally stored on only the eight logical partitions (i.e., LP0-LP7) of data storage node 400, as previously discussed with reference to FIG. 4. On logical partitions LP0-LP7, database manager 340 configures data blocks B8-B15 as virtual partitions VP8-VP15, respectively.

The physical data storage capacity of data processing environment 310 available to house database 350 is then expanded to include an additional data storage node 800. As noted with respect to block 712, database manager 340 configures data storage node 800 with eight logical partitions numbered LP8-LP15. In addition, in accordance with blocks 720-730 of FIG. 7, database manager 340 redistributes each of virtual partitions VP8-VP15 (corresponding to data blocks B8-B15, respectively) to a respective one of logical partitions LP8-LP15 on data storage node 800, leaving data blocks B0-B7 on logical partitions LP0-LP7 of data storage node 400.

Assuming data storage node 800 resides on a server 312 having the hostname "ServerB," database manager 340 updates partition configuration data structure 352 from the state summarized above in Table I to that given in Table III below.

TABLE III

| Node No. | Hostname | Logical Port No. | VP |
|---|---|---|---|
| 0 | ServerA | 0 | — |
| 1 | ServerA | 1 | — |
| 2 | ServerA | 2 | — |

TABLE III-continued

| Node No. | Hostname | Logical Port No. | VP |
|---|---|---|---|
| 3 | ServerA | 3 | — |
| 4 | ServerA | 4 | — |
| 5 | ServerA | 5 | — |
| 6 | ServerA | 6 | — |
| 7 | ServerA | 7 | — |
| 8 | ServerB | 0 | — |
| 9 | ServerB | 1 | — |
| 10 | ServerB | 2 | — |
| 11 | ServerB | 3 | — |
| 12 | ServerB | 4 | — |
| 13 | ServerB | 5 | — |
| 14 | ServerB | 6 | — |
| 15 | ServerB | 7 | — |

In addition, database manager 350 updates partition map 354 from the state summarized above in Table II to that given in Table IV below.

TABLE IV

| Hash Value | Virtual Partition No. | Logical Partition No. |
|---|---|---|
| 0 | — | 0 |
| 1 | — | 1 |
| 2 | — | 2 |
| 3 | — | 3 |
| ... | ... | ... |
| 7 | — | 7 |
| 8 | — | 0 |
| 9 | — | 1 |
| 10 | — | 2 |
| ... | ... | ... |
| 15 | — | 7 |
| 16 | — | 0 |
| ... | ... | ... |
| 23 | — | 7 |
| 24 | — | 0 |
| ... | ... | ... |
| 31 | — | 7 |
| ... | ... | ... |
| 4095 | — | 7 |

Figure 1:
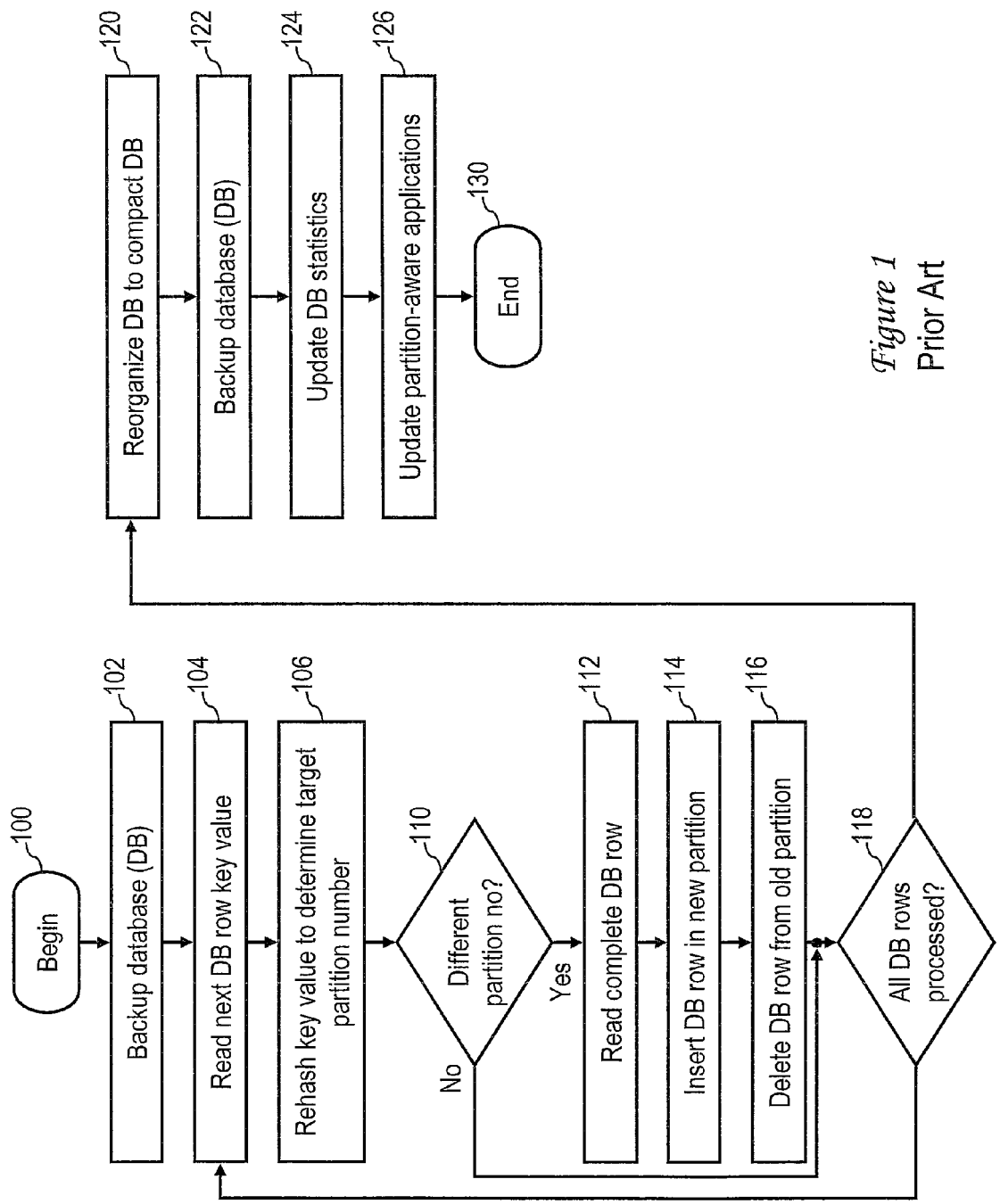
FIG. 1 is a high level flowchart of a conventional process for redistributing and reorganizing a database in accordance with the prior art.
Figure 2A:
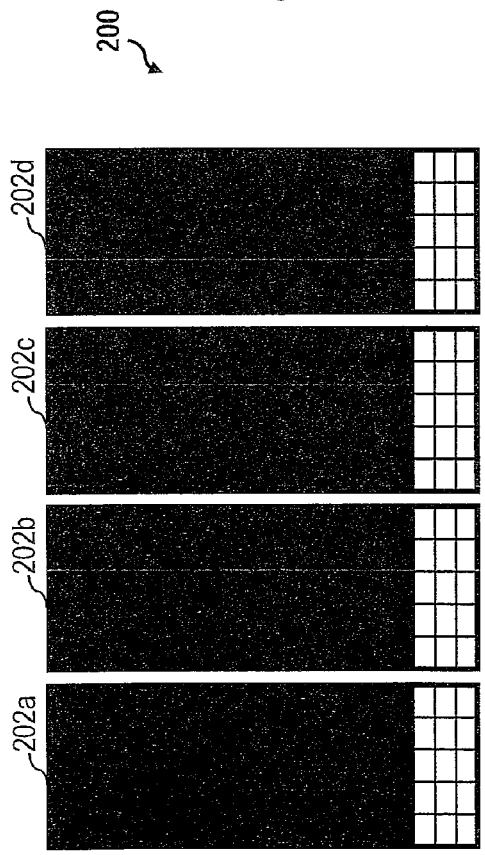
FIGS. 2A-2C depicts the conventional redistribution and reorganization of a database over new data storage nodes in accordance with the prior art.
Figure 2B:
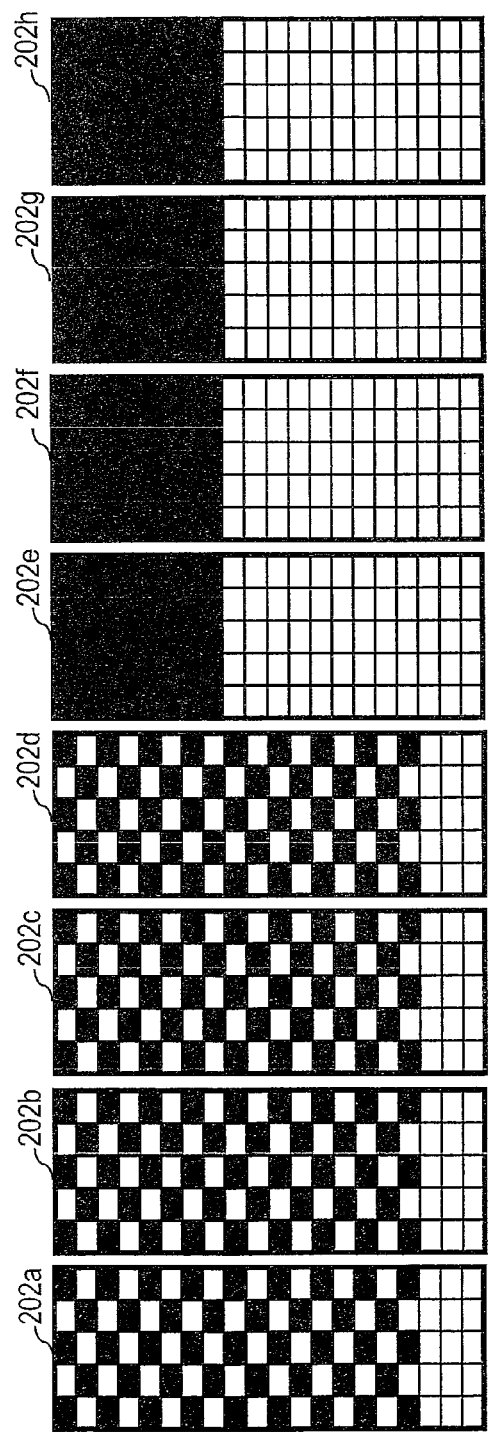
Figure 2C:
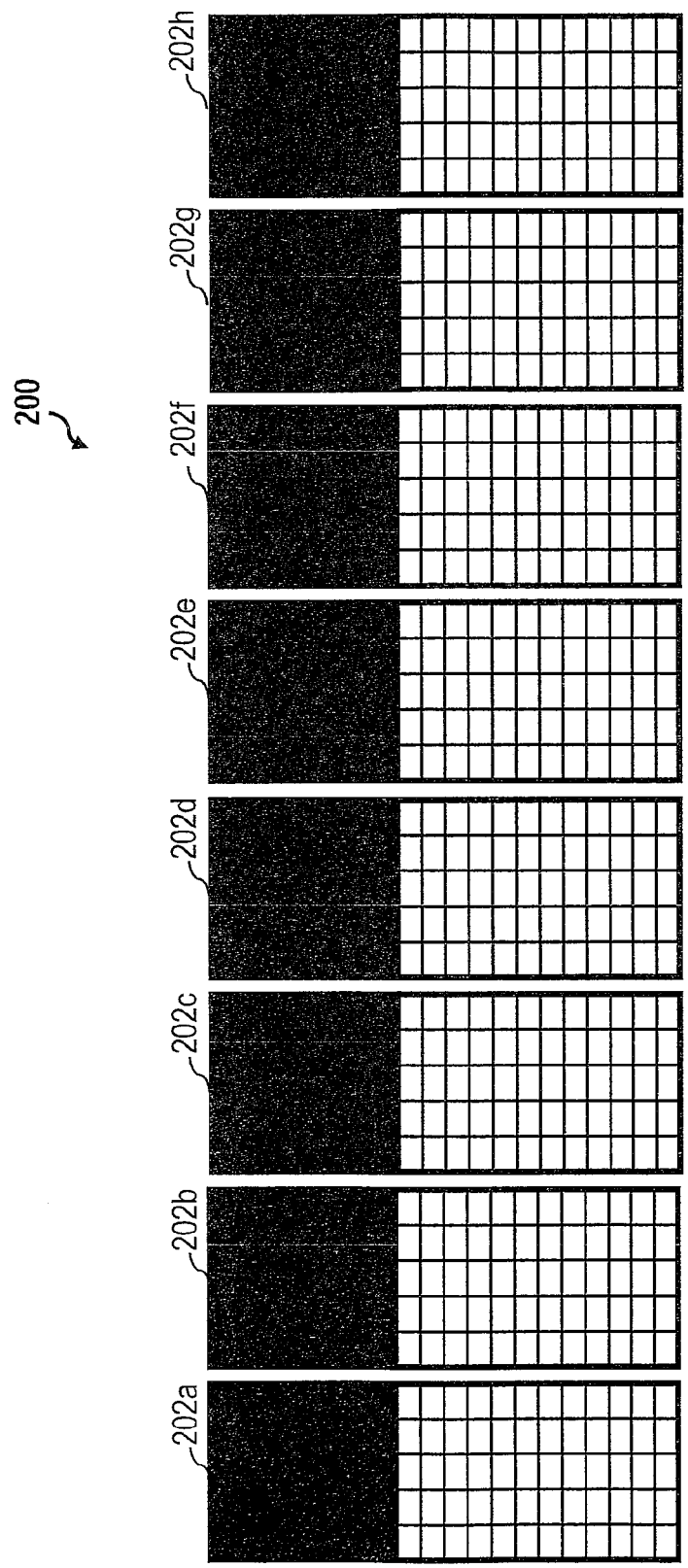

It should be noted by comparison of FIG. 1 with FIGS. 7-8 that the exemplary process depicted in FIG. 7 renders unnecessary many of the processing-intensive steps of FIG. 1. For example, in FIG. 7, there is no need to rehash the rows of database 350, as depicted at block 106. In addition, there is no need to backup database 350 before or after the redistribution of database 350, as depicted at blocks 102 and 122 of FIG. 1. Further, there is no need to reorganize database 120, as depicted at block 120, or to update database statistics, as depicted at block 124. Finally, there is no need to update partition-aware applications, as shown at block 126.

Figure 9:
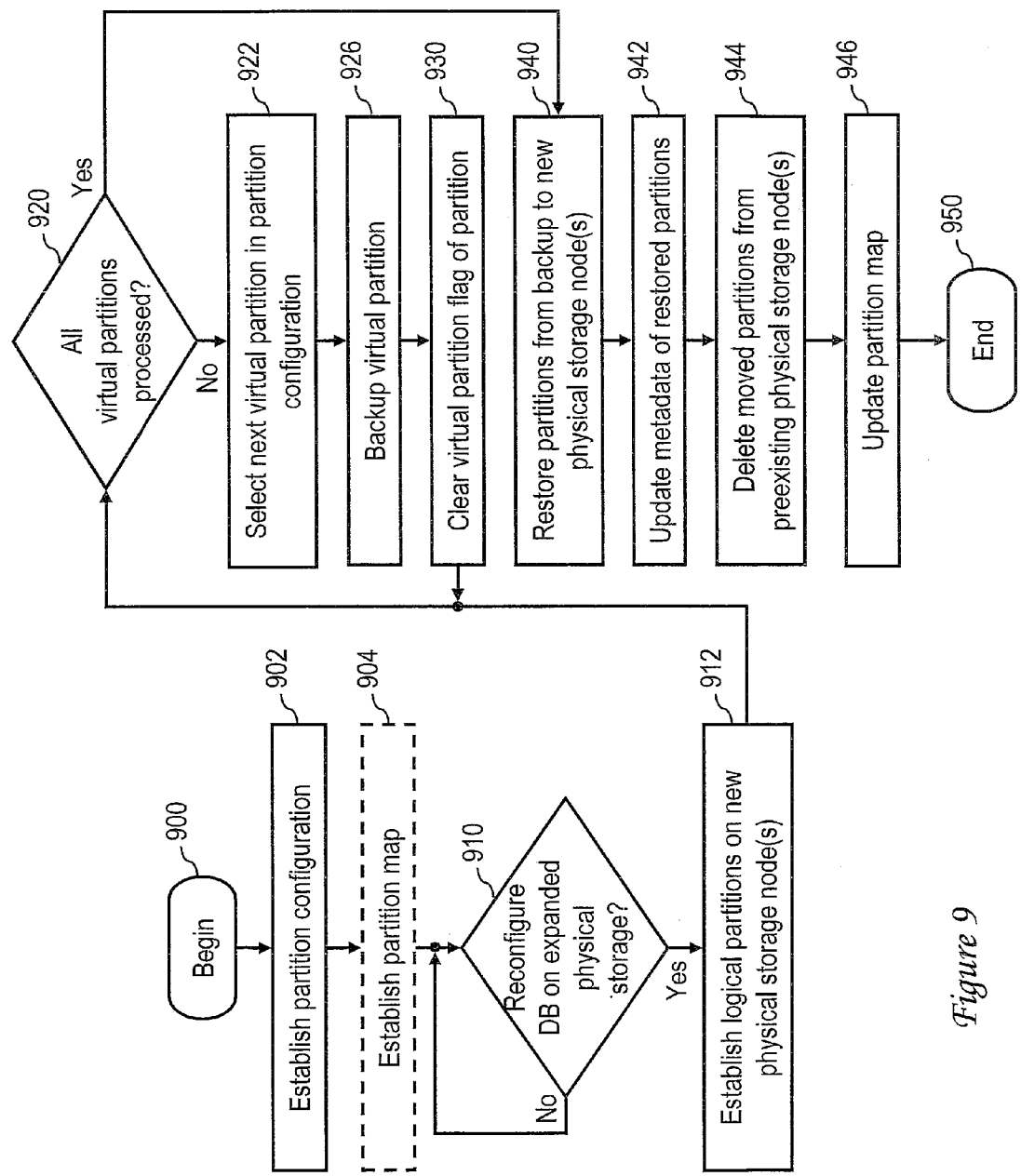
FIG. 9 is a high level logical flowchart of a second exemplary embodiment of a method of redistributing a database.

With reference to FIG. 9, there is illustrated a high level logical flowchart of an exemplary method of redistributing a database in accordance with a second embodiment. In particular, the process depicted in FIG. 9 redistributes database 350 onto one or more newly allocated physical storage nodes via a backup and restore of the virtual partitions of database 350.

The process depicted in FIG. 9 begins at block 900 and thereafter proceeds to block 902, which illustrates database manager 340 configuring a desired number of virtual partitions in database 350, for example, in response to an administrator input, as described previously. With the number and location of virtual partitions configured, database manager 340 optionally establishes partition map 354 in order to quickly map between hash values (e.g., of row keys) of data and the logical and virtual partitions configured by partition configuration data structure 352 (block 904). The process proceeds from block 904 to block 910, which depicts database manager 340 determining whether or not an input has been received indicating that database 350 is to be redistributed over an expanded physical storage capacity. If database manager 340 does not detect an input indicating that database 350 is to be redistributed over an expanded physical storage capacity, the process remains at block 910 (during which time, database manager 340 may perform other conventional database management operations).

In response to a determination by database manager 340 at block 910 that an input has been received indicating that database 350 is to be redistributed over an expanded physical storage capacity, the process passes to block 912. Block 912 depicts database manager 340 establishing logical partitions on the new physical storage node(s) allocated to store database 350. The process then enters a loop including blocks 920-930 in which virtual partitions are backed up from the preexisting logical partitions established at block 912. Referring first to block 920, database manager 340 determines, for example, by reference to partition configuration data structure 352 whether or not all virtual partitions of database 350 have been processed. In response to database manager 350 determining at block 920 that all virtual partitions of database 350 have been processed, the process proceeds from block 920 to block 940, which is described below. If, however, database manager 350 determines at block 920 that not all virtual partitions of database 350 have been processed, database manager 350 selects a virtual partition for processing, for example, the next virtual partition listed in partition configuration data structure 352 (block 922). Next, database manager 350 makes a backup of the selected virtual partition, but preferably excludes from the backup the remainder of the logical partition hosting the virtual partition (block 926). Database manager 350 then clears the virtual partition flag 508 associated with the selected virtual partition in partition configuration data structure 352 (block 930). The process returns from block 930 to block 920, which depicts database manager 340 processing the next virtual partition, if any.

In response to database manager 340 determining at block 920 that all virtual partitions of database 350 on the preexisting physical data storage node(s) have been processed, database manager 340 restores each of the virtual partitions from the backup made at block 926 to a respective logical partition of the newly allocated physical storage node(s) of data processing enterprise 310 (e.g., the logical partition having a logical partition number matching the virtual partition number of the backed up virtual partition). As a result, the moved partition is no longer a virtual partition and is converted into a data block on a logical partition of the newly allocated data storage node(s). Database manager 350 then updates the metadata stored in association with the restored partition on the data storage node (block 942) and deletes the moved partitions from the preexisting physical storage node(s) (block 944). Database manager 340 additionally updates partition map 354, if present, to reflect the modified relationship between hash values and logical and virtual partition numbers (block 946). Following block 946, the process depicted in FIG. 9 ends at block 950.

Figure 10:
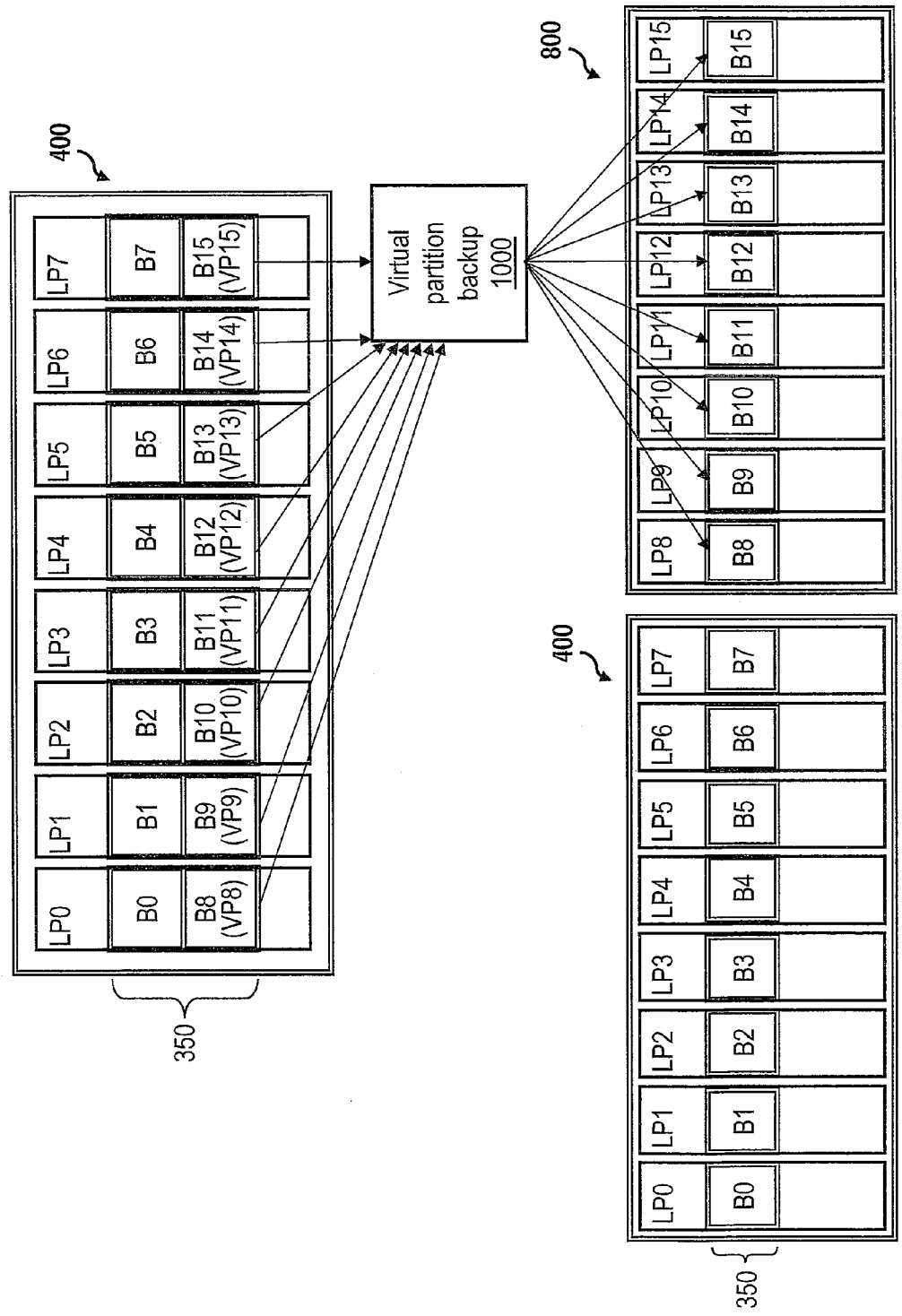
FIG. 10 depicts an exemplary redistribution of a database in accordance with the second exemplary method illustrated in FIG. 9.

FIG. 10 depicts an exemplary redistribution of a database in accordance with the second exemplary method illustrated in FIG. 9. In the example shown in FIG. 10, database 350 is originally stored on only the eight logical partitions (i.e., LP0-LP7) of data storage node 400, as previously discussed with reference to FIGS. 4 and 8. On logical partitions LP0-LP7, database manager 340 configures data blocks B8-B15 as virtual partitions VP8-VP15, respectively.

The physical data storage capacity of data processing environment 310 allocated to house database 350 is then expanded to include an additional data storage node 800, on which database manager 340 configures eight logical partitions numbered LP8-LP15. In accordance with blocks 920-930 of FIG. 9, database manager 340 creates a virtual partition backup 1000 containing a backup of each of virtual partitions VP8-VP15 (corresponding to data blocks B8-B15, respectively), and preferably excluding other data residing on logical partitions LP0-LP7. Rather than performing a conventional restore back to the host logical partitions, database manager 340 then restores each virtual partition from virtual partition backup 1000 to a respective one of logical partitions LP8-LP15 on data storage node 800. In addition, database manager 340 deletes the corresponding virtual partitions from data storage node 400, leaving data blocks B0-B7 on logical partitions LP0-LP7 of data storage node 400. In this manner, database manager 340 redistributes the virtual partitions of database 350 from preexisting physical data storage node 400 onto newly allocated physical data storage node 800 by leveraging its backup capabilities, rather than by directly moving the data as depicted in FIG. 8. The resulting partition configuration data structure 352 and partition map 354 will, however, be the same as summarized above in Tables III and IV.

As has been described, in at least some embodiments a partitioned database is stored in a plurality of logical or physical partitions on at least a logical or physical first data storage node, and a subset of a first partition among the plurality of logical partitions is configured as a virtual partition. An input indicating an allocation of a second physical data storage node to store the partitioned database is received. A second partition is configured on the second data storage node. In response to the input, the partitioned database is redistributed over the first and second data storage nodes by moving data within the virtual partition on the first partition to the second partition.

While the present invention has been particularly shown as described with reference to one or more preferred embodiments, it will be understood by those skilled in the art that various changes in form and detail may be made therein without departing from the spirit and scope of the invention. For example, although aspects have been described with respect to a computer system executing program code that directs the functions of the present invention, it should be understood that present invention may alternatively be implemented as a program product including a tangible, non-transient data storage medium (e.g., an optical or magnetic disk or memory) storing program code that can be processed by a data processing system to perform the functions of the present invention.

What is claimed is:

1. A program product, comprising:
a computer-readable storage device;
program code stored within the computer-readable storage device that, when executed by a computer, causes the computer to perform:
storing a partitioned database in a plurality of logical partitions on at least a first data storage node, wherein the plurality of logical partitions includes at least first and second logical partitions;
prior to receipt of an input causing redistribution of the partitioned database, a database manager of the program code pre-identifying data to be redistributed from the plurality of logical partitions by configuring a subset of the first logical partition as a first virtual partition and configuring a subset of the second logical partition as a second virtual partition, wherein the first virtual partition is restricted to data within the first logical partition and the second virtual partition is restricted to data within the second logical partition;
thereafter, configuring newly formed third and fourth partitions of the partitioned database on a second data storage node; and
in response to the input, the database manager of the program code redistributing the partitioned database over the first and second data storage nodes by:
moving data within the first virtual partition on the first logical partition to the third partition such that the first virtual partition no longer resides on the first logical partition and moving data within the second virtual partition on the second logical partition to the fourth partition such that the second virtual partition no longer resides on the second logical partition, wherein moving data to the third and fourth partitions includes:
creating a backup including first data within the first virtual partition and second data within the second virtual partition, but excluding data within the first and second logical partitions that are not within the first and second virtual partitions;
restoring the first data and the second data from the backup to the third and fourth partitions, respectively; and
retaining data in the first logical partition that is not within the first virtual partition and retaining data in the second logical partition that is not within the second virtual partition;
wherein:
redistributing the partitioned database includes the computer determining whether a virtual partition identifier assigned to the second virtual partition matches a partition identifier assigned to the fourth partition; and
moving data within the second virtual partition to the fourth partition comprises the computer moving data within the second virtual partition to the fourth partition only in response to the computer determining that the virtual partition identifier assigned to the second virtual partition matches the partition identifier assigned to the fourth partition.

2. The program product of claim 1, wherein:
the first virtual partition comprises one or more data blocks of the first logical partition; and
the second virtual partition comprises one or more data blocks of the second logical partition.

3. The program product of claim 1, wherein:
the program further causes the computer to perform establishing a partition configuration data structure associating the first virtual partition and the first logical partition and associating the second virtual partition and the second logical partition; and
the redistributing includes updating the partition configuration data structure to indicate that the data moved to the third and fourth partitions do not reside in any virtual partition.

4. The program product of claim 3, wherein:
the program further causes the computer to perform establishing a partition map mapping data within the partitioned database to particular ones of the plurality of logical partitions and the virtual partitions; and
the redistributing includes updating the partition map to indicate that data moved to the third and fourth partitions are not mapped to any virtual partition.

5. A data processing system, comprising:
a processor; and
data storage coupled to the processor; and
program code stored within the data storage that, when executed by the processor, causes the data processing system to perform:
storing a partitioned database in a plurality of logical partitions on at least a first data storage node, wherein the plurality of logical partitions includes at least first and second logical partitions;
prior to receipt of an input causing redistribution of the partitioned database, a database manager of the program code pre-identifying data to be redistributed from the plurality of logical partitions by configuring a subset of the first logical partition as a first virtual partition and configuring a subset of the second logical partition as a second virtual partition, wherein the first virtual partition is restricted to data within the first logical partition and the second virtual partition is restricted to data within the second logical partition;
thereafter, configuring newly formed third and fourth partitions of the partitioned database on a second data storage node; and
in response to the input, the database manager redistributing the partitioned database over the first and second data storage nodes by:
moving data within the first virtual partition on the first logical partition to the third partition such that the first virtual partition no longer resides on the first logical partition and moving data within the second virtual partition on the second logical partition to the fourth partition such that the second virtual partition no longer resides on the second logical partition, wherein moving data to the third and fourth partitions includes:
creating a backup including first data within the first virtual partition and second data within the second virtual partition, but excluding data within the first and second logical partitions that are not within the first and second virtual partitions;
restoring the first data and the second data from the backup to the third and fourth partitions, respectively; and
retaining data in the first logical partition that is not within the first virtual partition and retaining data in the second logical partition that is not within the second virtual partition;
wherein:
redistributing the partitioned database includes the data processing system determining whether a virtual partition identifier assigned to the second virtual partition matches a partition identifier assigned to the fourth partition; and
moving data within the second virtual partition to the fourth partition comprises the data processing system moving data within the second virtual partition to the fourth partition only in response to the data processing system determining that the virtual partition identifier assigned to the second virtual partition matches the partition identifier assigned to the fourth partition.

6. The data processing system of claim 5, wherein:
the first virtual partition comprises one or more data blocks of the first logical partition; and
the second virtual partition comprises one or more data blocks of the second logical partition.

7. The data processing system of claim 5, wherein:
the program further causes the computer to perform establishing a partition configuration data structure associating the first virtual partition and the first logical partition and associating the second virtual partition and the second logical partition; and
the redistributing includes updating the partition configuration data structure to indicate that the data moved to the third and fourth partitions do not reside in any virtual partition.

8. The data processing system of claim 7, wherein:
the program further causes the computer to perform establishing a partition map mapping data within the partitioned database to particular ones of the plurality of logical partitions and the virtual partitions; and
the redistributing includes updating the partition map to indicate that data moved to the third and fourth partitions are not mapped to any virtual partition.

9. A method of data processing in a data processing system including a processor, the method comprising:
storing a partitioned database in a plurality of logical partitions on at least a first data storage node, wherein the plurality of logical partitions includes at least first and second logical partitions;
prior to receipt of an input causing redistribution of the partitioned database, the processor pre-identifying data to be redistributed from the plurality of logical partitions by configuring a subset of the first logical partition as a first virtual partition and configuring a subset of the second logical partition as a second virtual partition, wherein the first virtual partition is restricted to data within the first logical partition and the second virtual partition is restricted to data within the second logical partition;
thereafter, the processor configuring newly formed third and fourth partitions of the partitioned database on a second data storage node; and
in response to the input, the processor redistributing the partitioned database over the first and second data storage nodes by:
moving data within the first virtual partition on the first logical partition to the third partition such that the first virtual partition no longer resides on the first logical partition and moving data within the second virtual partition on the second logical partition to the fourth partition such that the second virtual partition no longer resides on the second logical partition, wherein moving data to the third and fourth partitions includes:
creating a backup including first data within the first virtual partition and second data within the second virtual partition, but excluding data within the first and second logical partitions that are not within the first and second virtual partitions;
restoring the first data and the second data from the backup to the third and fourth partitions, respectively; and
retaining data in the first logical partition that is not within the first virtual partition and retaining data in the second logical partition that is not within the second virtual partition;
wherein:
redistributing the partitioned database includes the processor determining whether a virtual partition identifier assigned to the second virtual partition matches a partition identifier assigned to the fourth partition; and
moving data within the second virtual partition to the fourth partition comprises moving data within the second virtual partition to the fourth partition only in response to determining that the virtual partition identifier assigned to the second virtual partition matches the partition identifier assigned to the fourth partition.

10. The method of claim 9, wherein:

the first virtual partition comprises one or more data blocks of the first logical partition; and the second virtual partition comprises one or more data blocks of the second logical partition.

11. The method of claim 9, wherein:

the method includes establishing a partition configuration data structure associating the virtual partition and the first logical partition and associating the second virtual partition and the second logical partition; and the redistributing includes updating the partition configuration data structure to indicate that the data moved to the third and fourth partitions do not reside in any virtual partition.

12. The method of claim 11, wherein:

the method includes establishing a partition map mapping data within the partitioned database to particular ones of the plurality of logical partitions and the virtual partition; and the redistributing includes updating the partition map to indicate that data moved to the third and fourth partitions are not mapped to any virtual partition.

* * * * *